United States Patent
Dorfi et al.

(10) Patent No.: US 10,384,492 B2
(45) Date of Patent: Aug. 20, 2019

(54) TIRE WITH SUBSTANTIALLY HELICOID-SHAPED SIPE

(71) Applicant: Bridgestone Americas Tire Operations, LLC, Nashville, TN (US)

(72) Inventors: Hans R. Dorfi, Akron, OH (US); Jacob R. Kidney, Wadsworth, OH (US); Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 471 days.

(21) Appl. No.: 14/654,241

(22) PCT Filed: Dec. 17, 2013

(86) PCT No.: PCT/US2013/075545
§ 371 (c)(1),
(2) Date: Jun. 19, 2015

(87) PCT Pub. No.: WO2014/105502
PCT Pub. Date: Jul. 3, 2014

(65) Prior Publication Data
US 2015/0343850 A1     Dec. 3, 2015

Related U.S. Application Data

(60) Provisional application No. 61/745,827, filed on Dec. 26, 2012.

(51) Int. Cl.
*B60C 11/12*     (2006.01)
*B60C 11/24*     (2006.01)
*B29D 30/06*     (2006.01)

(52) U.S. Cl.
CPC .......... *B60C 11/1218* (2013.01); *B29D 30/06* (2013.01); *B60C 11/1222* (2013.01);
(Continued)

(58) Field of Classification Search
CPC ............ B60C 11/24; B60C 2011/1254; B60C 11/1218; B60C 11/1222
See application file for complete search history.

(56) References Cited

U.S. PATENT DOCUMENTS 6,786,257 B1 * 9/2004 Koide ................ B60C 11/11
152/209.1
7,392,832 B2   7/2008 Roesgen et al.
(Continued)

FOREIGN PATENT DOCUMENTS

CN     102448744 A     5/2012
CN     102470704 A     5/2012
(Continued)

OTHER PUBLICATIONS

Machine translation for Japan 02-246810 (no date).*
(Continued)

*Primary Examiner* — Steven D Maki
(74) *Attorney, Agent, or Firm* — Shaun J. Fox; Bryan Jaketic

(57) ABSTRACT

A tire includes a circumferential tread having a tread element disposed thereon, wherein the tread element includes a top surface that defines a first plane. The tire further includes at least one substantially helicoid-shaped sipe disposed in the tread element. The substantially helicoid-shaped sipe is defined by an opening in the top surface extending in a first direction in the first plane when the tire is new, and is further defined by a base extending in a second direction in a second plane parallel to the first plane. The second direction is disposed at an angle between 45° and 135° with respect to the first direction.

8 Claims, 5 Drawing Sheets

(52) U.S. Cl.
CPC ...... *B60C 11/24* (2013.01); *B29D 2030/0613* (2013.01); *B60C 2011/1209* (2013.01); *B60C 2011/1254* (2013.01); *Y10T 152/10027* (2015.01)

(56) References Cited

U.S. PATENT DOCUMENTS

| | | | |
|---|---|---|---|
| 2003/0205305 A1 | 11/2003 | Kuwajima et al. | |
| 2006/0037683 A1* | 2/2006 | Cuny | B60C 11/24 152/154.2 |
| 2011/0126949 A1* | 6/2011 | Cuny | B29D 30/0606 152/154.2 |
| 2012/0060989 A1* | 3/2012 | Kuwajima | B60C 11/12 152/209.18 |
| 2012/0090750 A1* | 4/2012 | Kuwajima | B60C 11/12 152/209.23 |
| 2012/0125499 A1* | 5/2012 | Harvey | B60C 11/24 152/154.2 |

FOREIGN PATENT DOCUMENTS

| | | | |
|---|---|---|---|
| EP | 0881103 A1 | | 2/1998 |
| EP | 2329967 A | | 6/2011 |
| FR | 2722145 A | * | 1/1996 |
| JP | 02-246810 A | * | 10/1990 |
| JP | 03-092402 A | * | 4/1991 |
| JP | 9-263111 A | | 10/1997 |
| JP | 09323510 A | | 12/1997 |
| JP | 10138715 A | | 5/1998 |
| JP | 11-48721 A | | 2/1999 |
| JP | 2002-029226 A | | 1/2002 |
| JP | 2003-320814 A | | 11/2003 |
| JP | 2006-027306 A | * | 2/2006 |
| JP | 2006027306 A | | 2/2006 |
| JP | 2006-273319 A | | 10/2006 |
| JP | 2011-11695 A | | 1/2011 |
| JP | 2012025301 | | 2/2012 |
| KR | 10-2012-0067423 A | | 6/2012 |

OTHER PUBLICATIONS

Machine translation for FR 2,722,145 (Year: 2018).*
Machine translation for Japan 03-092402 (Year: 2018).*
Machine translation for Japan 2006-027306 (Year: 2019).*
Office Action; corresponding Russian Application No. 2015128767; Russian Examiner; dated Nov. 3, 2016.
Office Action Translation; corresponding Russian Application No. 2015128767; Russian Examiner; dated Nov. 3, 2016.
Office Action; corresponding Japanese Application No. 2015-550467; Japanese Examiner; dated Dec. 6, 2016.
International Preliminary Report on Patentability and Written Opinion; corresponding PCT Application No. PCT/US2013075545; dated Jun. 30, 2015.
Song, Ho Keun, International Search Report for PCT/US13/75545, 3 pp., (dated Apr. 18, 2014).
Ryoko Masuda, Translation of Office Action for Japanese Patent Application No. 2015-550467, 3 pages (dated May 10, 2016).
Karl Billen, Supplementary European Search Report for European Application No. EP 13 86 7589, 6 pages (dated Jul. 15, 2016).
State Intellectual Property Office of the People's Republic of China, Translation of Office Action for Chinese Patent Application No. 201380068228.8, 8 pages (dated Jun. 1, 2016).

* cited by examiner

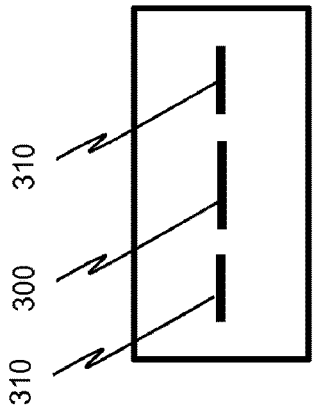
Fig. 6A
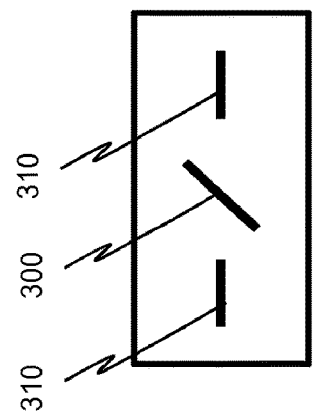
Fig. 6B
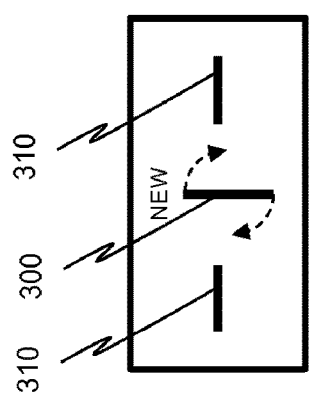
Fig. 6C
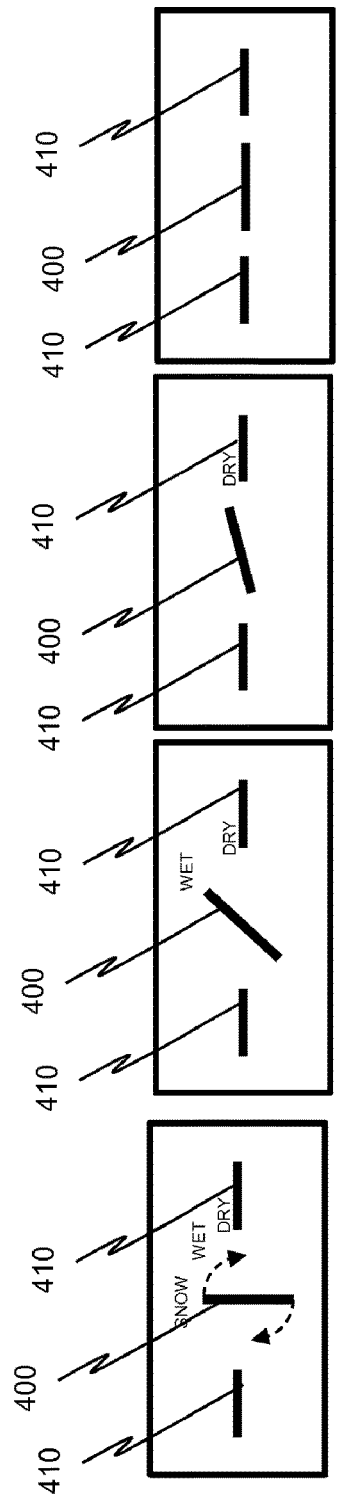
Fig. 7A
Fig. 7B
Fig. 7C
Fig. 7D

TIRE WITH SUBSTANTIALLY HELICOID-SHAPED SIPE

FIELD OF INVENTION

The present disclosure relates to a tire having a circumferential tread with at least one sipe disposed therein. More particularly, the present disclosure relates to a tire having a circumferential tread with at least one substantially helicoid-shaped sipe disposed therein.

BACKGROUND

Many motor vehicle tires have a circumferential tread provided with a plurality of circumferential grooves that define ribs there between. Generally lateral slots can be provided in the ribs to form a plurality of shaped blocks, known as tread blocks. These tread blocks can be distributed along the tread according to a specific pattern. Sipes, which are generally narrow slits cut into the tread, can be provided in the tread blocks to improve wet, snow, and ice traction of the tire.

SUMMARY OF THE INVENTION

In one embodiment, a tire includes a circumferential tread having a tread element disposed thereon, wherein the tread element includes a top surface that defines a first plane. The tire further includes at least one substantially helicoid-shaped sipe disposed in the tread element. The substantially helicoid-shaped sipe is defined by an opening in the top surface extending in a first direction in the first plane when the tire is new, and is further defined by a base extending in a second direction in a second plane parallel to the first plane. The second direction is disposed at an angle between 45° and 135° with respect to the first direction.

In another embodiment, a tire includes a circumferential tread having a tread element disposed thereon, wherein the tread element includes a top surface defining a surface plane. The tire further includes at least one wear indicator sipe disposed in the tread element. The wear indicator sipe includes an opening in the top surface extending in a first direction in the surface plane when the tire is new, and further includes a base extending in a second direction in a second plane parallel to the first plane. As the tire wears, the opening of the wear indicator sipe extends in a third direction in the first plane, the third direction bisecting an angle between the first direction and the second direction, and conveying wear-related information to a user.

In yet another embodiment, a method of making a substantially helicoid-shaped sipe in a tire includes providing a tire having a circumferential tread with a plurality of tread element. The method further includes providing a substantially helicoid-shaped sipe blade having a leading edge and a twisted body having a pitch such that the body turns between 9-18° per millimeter. The method also includes inserting the substantially helicoid-shaped sipe blade into one of the plurality of tread elements, while turning the substantially helicoid-shaped sipe blade in a first direction at a rate corresponding to the pitch of the twisted body. The method additionally includes retracting the substantially helicoid-shaped sipe blade from the tread element, while turning the substantially helicoid-shaped sipe blade in a second direction, opposite the first direction, at a rate corresponding to the pitch of the twisted body.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIGS. 6A-C are schematic drawings illustrating top views of one embodiment of a helicoid-shaped sipe as a wear indicator;

FIGS. 7A-D are schematic drawings illustrating top views of an alternative embodiment of a helicoid-shaped sipe as a wear indicator.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Figure 1:
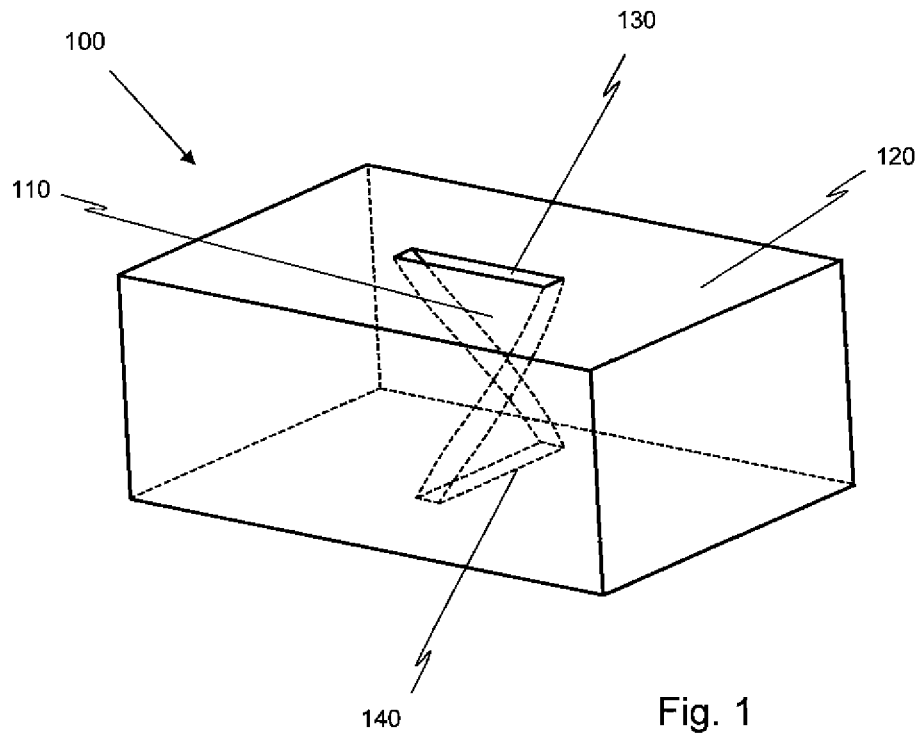
FIG. 1 is a perspective view of one embodiment of a tread element 100 having a helicoid-shaped sipe disposed therein.
Figure 2:
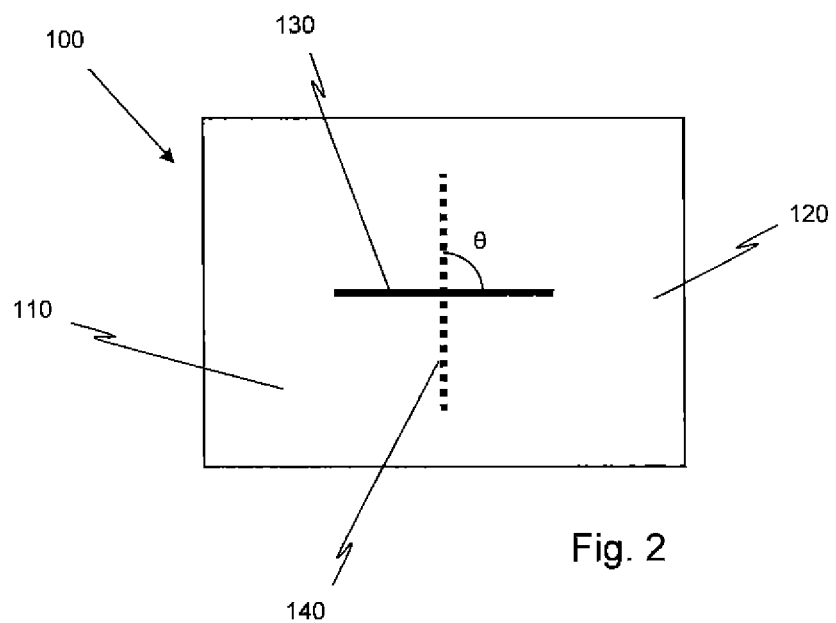
FIG. 2 is a top view of the tread element 100.

FIG. 1 illustrates a perspective view of a tread element 100 of a tire, having a substantially helicoid-shaped sipe 110 disposed therein. FIG. 2 illustrates a top view of the tread element 100 and the substantially helicoid-shaped sipe 110. The tread element 100 and substantially helicoid-shaped sipe 110 are described herein with reference to both FIGS. 1 and 2. While the tread element 100 is illustrated as a cube-shaped block, it should be understood that the tread element may be a rib, or take any geometric shape.

The tread element 100 includes a top surface 120 that defines a first plane. While one of ordinary skill in the art would understand that a tire is a toroid and the top surface of a tread element is therefore curved, the radius of curvature is such that top surface is nearly planar. Accordingly, for convenience, the top surface 120 is described herein as approximately planar. This description is not intended to be limiting.

The substantially helicoid-shaped sipe 110 is defined by an opening 130 in the top surface 120. The opening 130 extends in a first direction in the first plane when the tire is new. The substantially helicoid-shaped sipe 110 is further defined by a base 140 extending in a second direction in a second plane parallel to the first plane. In the illustrated embodiment, the base 140 is disposed at an angle θ of 90° with respect to the opening 130. In other words, the first direction is substantially normal to the second direction. In alternative embodiments, the second direction is disposed at an angle between 45° and 135° with respect to the first direction.

In geometric terms, a helicoid is a ruled surface. For every point on a helicoid, there is a helix contained in the helicoid which passes through that point. Generally, a helicoid is defined by the following parametric equations in Cartesian coordinates:

$$x = \rho \cos(\alpha\theta),$$

$$y = \rho \sin(\alpha\theta),$$

$$z = \theta,$$

where α is a constant. In one embodiment, the shape of the substantially helicoid-shaped sipe 110 is defined by the above parametric equations. However, it should be understood that the substantially helicoid-shaped sipe need not be defined precisely by these equations. In alternative embodiments, the helicoid-shaped sipe may be an approximation of a helicoid, or a twisted void having a generally helicoid shape.

In one particular embodiment, the substantially helicoid-shaped sipe 110 has a pitch such that the sipe turns 11.25° per millimeter of depth. In other words, the substantially helicoid-shaped sipe 110 turns 90° over a depth of 8 millimeters. In other known embodiments, the substantially helicoid-shaped sipe 110 has a pitch such that the sipe turns between 9-18° per millimeter of depth.

As the tire wears, the opening 130 of the substantially helicoid-shaped sipe 110 in the top surface 120 extends in a third direction in the first plane. The third direction is between the first direction and the second direction.

Figure 3:
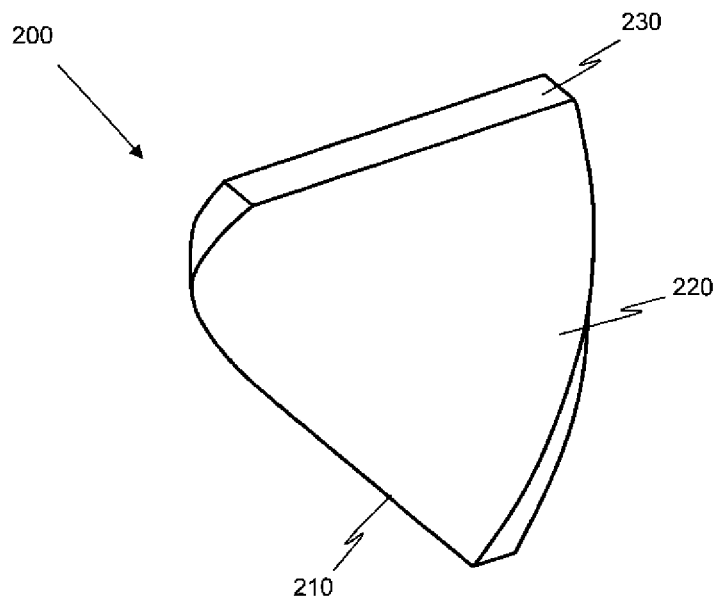
FIG. 3 is a perspective view of a helicoid-shaped sipe blade 200.
Figure 4:
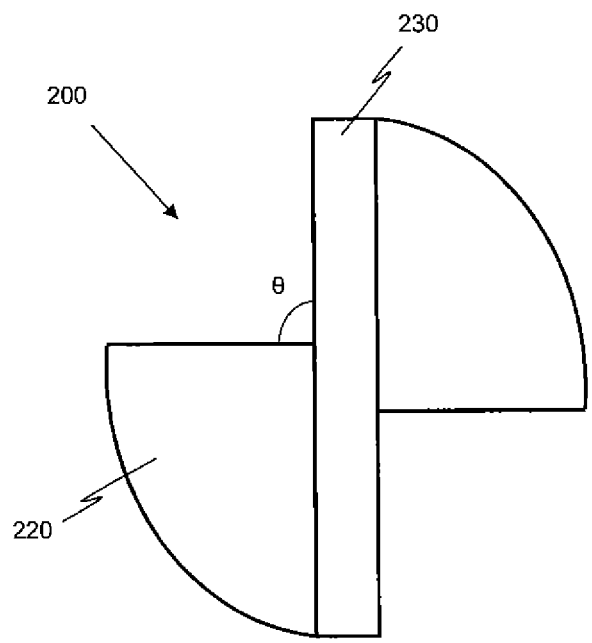
FIG. 4 is a top view of the helicoid-shaped sipe blade 200.
Figure 5:
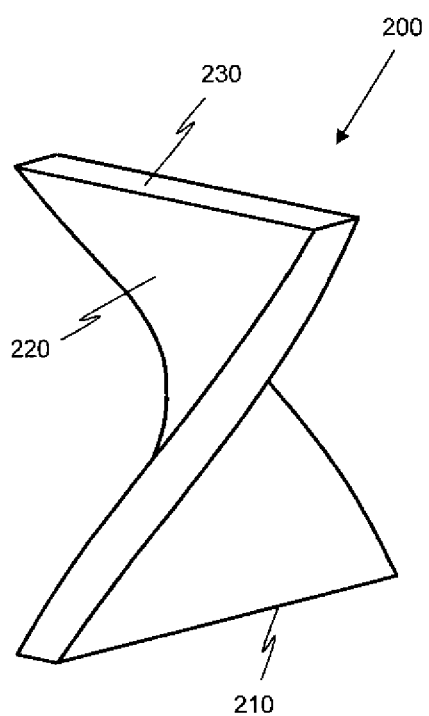
FIG. 5 is a side view of the helicoid-shaped sipe blade 200.

The substantially helicoid-shaped sipe 110 may be formed by a substantially helicoid-shaped sipe blade. FIG. 3 illustrates a perspective view of one embodiment of a substantially helicoid-shaped sipe blade 200. FIGS. 4 and 5 illustrate top and side views, respectively, of the substantially helicoid-shaped sipe blade 200. The substantially helicoid-shaped sipe blade 200 is described herein with reference to all of FIGS. 3-5.

The substantially helicoid-shaped blade 200 has a leading edge 210 and a twisted body 220. In the illustrated embodiment, only the sipe forming portion of the blade 200 is shown. Accordingly, the twisted body 220 appears to terminate at a second end 230 that corresponds to an opening of a sipe. However, it should be understood that the blade may continue beyond the second end, in either a straight or twisted formation.

In the illustrated embodiment, the leading edge 210 is disposed at an angle θ of 90° with respect to the second end 230 when viewed from above (as shown in FIG. 4). In alternative embodiments, the leading edge is disposed at an angle between 45° and 135° with respect to the second end.

In one embodiment, the shape of the substantially helicoid-shaped blade 200 is defined by the following parametric equations in Cartesian coordinates:

$$x = \rho \cos(\alpha\theta),$$

$$y = \pi \sin(\alpha\theta),$$

$$z = \theta,$$

where α is a constant. However, it should be understood that the substantially helicoid-shaped blade need not be defined precisely by these equations. In alternative embodiments, the helicoid-shaped blade may be an approximation of a helicoid, or a twisted body having a generally helicoid shape.

In one particular embodiment, the substantially helicoid-shaped blade 200 has a pitch such that the twisted body 220 turns 11.25° per millimeter of depth. In other words, the substantially helicoid-shaped blade 200 turns 90° over a depth of 8 millimeters. In other known embodiments, the substantially helicoid-shaped blade 200 has a pitch such that the twisted body 220 turns between 9-18° per millimeter of depth.

In one known embodiment, a 90 degree turning helicoid sipe is provided on a tire, and aligned such that when the tire is new the opening of the sipe extends in the circumferential direction of the tire. As the tire wears the void on the worn surface becomes more lateral. This embodiment may provide improved circumferential pattern stiffness in the new tire while allowing increased lateral void for retained snow traction in the worn tire. Such a tire would be expected to have improved stopping distance when new and improved snow traction when worn as compared to a tire with a lateral or circumferential straight sipe.

To form a substantially helicoid-shaped sipe, a user provides a substantially helicoid-shaped sipe blade, such as the blade 200, having a leading edge and a twisted body. The user also provides a tire having a circumferential tread with a plurality of tread elements. In one embodiment, the tire is a green tire. In an alternative embodiment, the tire is a vulcanized tire.

The user inserts the substantially helicoid-shaped sipe blade into one of the plurality of tread elements, while turning the substantially helicoid-shaped sipe blade in a first direction at a rate corresponding to the pitch of the twisted body. The user continues to insert and turn the blade, until the blade reaches a pre-determined depth. The user then retracts the substantially helicoid-shaped sipe blade from the tread element, while turning the substantially helicoid-shaped sipe blade in a second direction, opposite the first direction. The user turns the blade at a rate corresponding to the pitch of the twisted body. The resulting sipe is a helicoid-shaped sipe. This method may be performed manually or through an automated process.

In one embodiment, the above method is performed in a green tire, and the tire is vulcanized prior to the sipe blade being retracted from the tire. Such a process may be referred to as curing the sipe into the tire, and results in a void having dimensions that correspond to the dimensions of the substantially helicoid-shaped sipe blade. In an alternative embodiment, the method is performed on a vulcanized tire. Such a process may be referred to as cutting the sipe into the tire, and results in a smaller void, or almost no void, because material is cut but not removed from the tire.

Because the direction of the opening of a substantially helicoid-shaped sipe changes as the tire wears, the direction of the opening of the sipe in the top surface may convey wear-related information to a user. Accordingly a substantially helicoid-shaped sipe may function as a wear indicator sipe. FIGS. 6-8 illustrate various examples of such wear indicators sipes.

FIGS. 6A-C are schematic drawings illustrating top views of one embodiment of a wear indicator sipe 300. The wear indicator sipe 300 is a substantially helicoid-shaped sipe, such as the sipe 100 described above with reference to FIGS. 1 and 2. In other words, in one embodiment the wear indicator sipe 300 has an opening in the top surface of a tread element that extends in a first direction when the tire is new. The wear indicator sipe 300 is further defined by a base (not shown) extending in a second direction disposed at an angle of 90° with respect to the opening. In an alternative embodiment (not shown), other sipes having variable cross-sections may be employed.

FIG. 6A illustrates a top view of the wear indicator sipe 300 and reference sipes 310, when the tire is new. At this stage, the wear indicator sipe 300 extends in the first direction substantially, perpendicular to the reference sipes 310. The reference sipes 310 are straight sipes that maintain their direction as the tire wears. In alternative embodiments, the reference sipes may be disposed in any direction. It should be understood that reference sipes are optional and may be omitted.

FIG. 6B illustrates a top view of the wear indicator sipe 300 when the tire is half worn. The opening of the wear indicator sipe 300 extends in a third direction at an angle bisecting the first direction (of the original opening) and the second direction (of the base of the sipe). In other words, the third direction is at an angle of 45° with respect to the first direction and is also at an angle of 45° with respect to the second direction. In the illustrated embodiment, the opening of the wear indicator sipe 300 also extends at an angle of 45° with respect to the orientation of the reference sipes 310. This orientation of the opening of the wear indicator sipe 300 indicates to a user that the tire is half worn. However, it should be understood that the pitch of the wear indicator sipe may be selected so that any angle may be used to indicate that the tire is half worn.

FIG. 6C illustrates a top view of the wear indicator sipe 300 when the tire is fully worn. The opening of the wear indicator sipe 300 extends substantially in the second direction (i.e., the direction of the base of the sipe). In the illustrated embodiment, the opening of the wear indicator sipe 300 also extends in the same direction as the reference sipes 310. This orientation of the opening of the wear indicator sipe 300 indicates to a user that the tire is fully worn. However, it should be understood that the pitch of the wear indicator sipe may be selected so that any angle may be used to indicate that the tire is fully worn.

FIGS. 7A-D are schematic drawings illustrating top views of an alternative embodiment of a wear indicator sipe 400. In this embodiment, the wear indicator sipe 400 indicates the weather conditions for which the tire has appropriate traction. The wear indicator sipe 400 is a helicoid-shaped sipe, such as the sipe 100 described above with reference to FIGS. 1 and 2. In other words, in one embodiment the wear indicator sipe 400 has an opening in the top surface of a tread element that extends in a first direction when the tire is new. The wear indicator sipe 400 is further defined by a base (not shown) extending in a second direction disposed at an angle of 90° with respect to the opening. In an alternative embodiment (not shown), other sipes having variable cross-sections may be employed.

FIG. 7A illustrates a top view of the wear indicator sipe 400 and reference sipes 410, when the tire has traction appropriate for snow, wet, or dry conditions. At this stage, the wear indicator sipe 400 extends in the first direction, substantially perpendicular to the reference sipes 410. The reference sipes 410 are straight sipes that maintain their direction as the tire wears. In alternative embodiments, the reference sipes may be disposed in any direction. It should be understood that reference sipes are optional and may be omitted.

FIG. 7B illustrates a top view of the wear indicator sipe 400 when the tire has appropriate traction for wet or dry conditions. The opening of the wear indicator sipe 400 extends in a third direction at an angle bisecting the first direction (of the original opening) and the second direction (of the base). In other words, the third direction is at an angle of 45° with respect to the first direction and is also at an angle of 45° with respect to the second direction. In the illustrated embodiment, the opening of the wear indicator sipe 400 also extends at an angle of 45° with respect to the orientation of the reference sipes 410. This orientation of the opening of the wear indicator sipe 400 indicates to a user that the tire has traction appropriate for wet or dry conditions. However, it should be understood that the pitch of the wear indicator sipe may be selected so that any angle may be used to indicate that the tire has traction appropriate for wet or dry conditions.

FIG. 7C illustrates a top view of the wear indicator sipe 400 when the tire has appropriate traction for dry conditions. The opening of the wear indicator sipe 400 extends in a fourth direction between the third direction (shown in FIG. 7B) and the second direction (of the base of the sipe). This orientation of the opening of the wear indicator sipe 400 indicates to a user that the tire has traction appropriate for dry conditions. However, it should be understood that the pitch of the wear indicator sipe may be selected so that any angle may be used to indicate that the tire has traction appropriate for dry conditions.

FIG. 7D illustrates a top view of the wear indicator sipe 400 when the tire is fully worn. The opening of the wear indicator sipe 400 extends substantially in the second direction (i.e., the direction of the base of the sipe). In the illustrated embodiment, the opening of the wear indicator sipe 400 also extends in the same direction as the reference sipes 410. This orientation of the opening of the wear indicator sipe 400 indicates to a user that the tire is fully worn. However, it should be understood that the pitch of the wear indicator sipe may be selected so that any angle may be used to indicate that the tire is fully worn.

In an alternative embodiment (not shown), the wear indicator sipe may have a variable pitch, rather than a substantial helicoid shape. The pitch may be varied such that an opening of the wear indicator sipe is disposed at prescribed angles at different depths that may not be evenly spaced. By way of example, an opening of a helicoid-shaped sipe would be disposed at an angle of 90° when the tire is new, 60° when the tire is one-third worn, 30° when the tire is two-thirds worn, and 0° when the tire is fully worn. However, one or more of these angles may be adjusted by varying the pitch of the sipe.

Figure 8C:
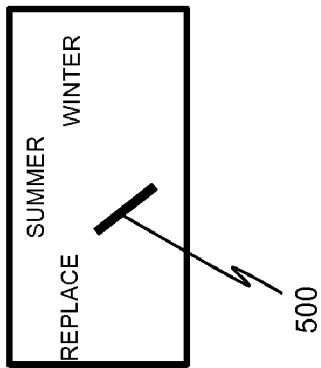
FIGS. 8A-C are schematic drawings illustrating top views of another alternative embodiment of a helicoid-shaped sipe as a wear indicator.
Figure 8B:
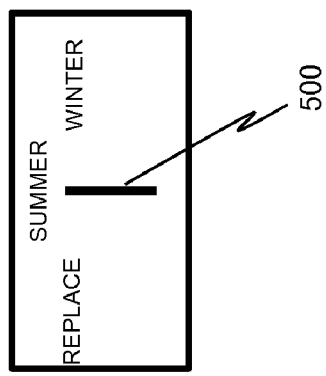
Figure 8A:
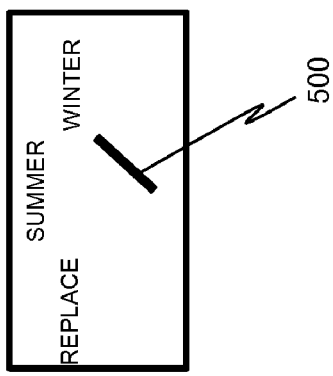

FIGS. 8A-C are schematic drawings illustrating top views of an alternative embodiment of a wear indicator sipe 500. In this embodiment, the wear indicator sipe 500 indicates the season for which the tire has appropriate traction. The wear indicator sipe 500 is a helicoid-shaped sipe, such as the sipe 100 described above with reference to FIGS. 1 and 2. In other words, in one embodiment the wear indicator sipe 500 has an opening in the top surface of a tread element that extends in a first direction when the tire is new. The wear indicator sipe 500 is further defined by a base (not shown) extending in a second direction disposed at an angle of 90° with respect to the opening. In an alternative embodiment (not shown), other sipes having variable cross-sections may be employed.

FIG. 8A illustrates a top view of the wear indicator sipe 500, when the tire has traction appropriate for winter conditions. At this stage, the wear indicator sipe 400 extends in a direction in the first direction.

FIG. 8B illustrates a top view of the wear indicator sipe 500 when the tire has appropriate traction for summer conditions. The opening of the wear indicator sipe 500 extends in a third direction at an angle bisecting the first direction (of the original opening) and the second direction (of the base of the sipe). In other words, the third direction is at an angle of 45° with respect to the first direction and is also at an angle of 45° with respect to the second direction. This orientation of the opening of the wear indicator sipe 500 indicates to a user that the tire has traction appropriate for summer conditions. However, it should be understood that the pitch of the wear indicator sipe may be selected so that any angle may be used to indicate that the tire has traction appropriate for summer conditions.

FIG. 8C illustrates a top view of the wear indicator sipe 500 when the tire is fully worn. The opening of the wear indicator sipe 500 extends substantially in the second direction (i.e., the direction of the base). This orientation of the opening of the wear indicator sipe 500 indicates to a user that the tire is fully worn. However, it should be understood that the pitch of the wear indicator sipe may be selected so that any angle may be used to indicate that the tire is fully worn.

In an alternative embodiment (not shown), the wear indicator sipe may have a variable pitch, rather than a substantial helicoid shape.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
a circumferential tread having a tread element disposed thereon, wherein the tread element includes a top surface that defines a first plane; and
at least one substantially helicoid-shaped sipe disposed in the tread element,
wherein the substantially helicoid-shaped sipe is defined by a single narrow slit defining an opening in the top surface having a first length and a first width,
wherein the single narrow slit is formed by two opposed, parallel walls that extend between a first closed end and a second closed end without interruption,
wherein the single narrow slit extends only in a first direction in the first plane when the tire is new, the first direction being a substantially circumferential direction,
wherein the substantially helicoid-shaped sipe is further defined by a base having a second length equal to the first length, a second width equal to the first width, and extending in a second direction in a second plane parallel to the first plane,
wherein the second direction is disposed at an angle between 45° and 135° with respect to the first direction,
wherein the substantially helicoid-shaped sipe is further defined by a sipe axis extending from a first point on the base to a second point at the opening in the top surface, the sipe axis extending at 0° with respect to a radial direction of the tire, and
wherein the substantially helicoid-shaped sipe has a pitch such that the substantially helicoid-shaped sipe turns between 9-18° per millimeter of depth.

2. The tire of claim 1, wherein the first direction is substantially normal to the second direction.

3. The tire of claim 1, wherein the shape of the substantially helicoid-shaped sipe is defined by the following parametric equations in Cartesian coordinates:

$$x = \rho \cos(\alpha\theta),$$

$$y = \rho \sin(\alpha\theta),$$

$$z = \theta,$$

where $\alpha$ is a constant.

4. The tire of claim 1, wherein as the tire wears, the single narrow slit of the substantially helicoid-shaped sipe in the top surface extends in a third direction in the first plane, the third direction being between the first direction and the second direction.

5. The tire of claim 1, wherein the direction of the single narrow slit of the substantially helicoid-shaped sipe in the top surface conveys wear-related information to a user.

6. The tire of claim 1, wherein the substantially helicoid-shaped sipe has a pitch such that the substantially helicoid-shaped sipe turns 11.25° per millimeter of depth.

7. The tire of claim 1, wherein the second direction is a substantially lateral direction.

8. The tire of claim 1, wherein the substantially helicoid sipe causes the tread element to become less circumferentially stiff as the tire wears.

* * * * *